3,356,697
3 - LOWER ALKANOYLHYDRAZONO - 10 - HYDROPEROXY - 13 - ALKYL - 4 - GONENES AND METHODS FOR THEIR MANUFACTURE
Elliot L. Shapiro, Cedar Grove, and Lawrence E. Finckenor, Wayne, N.J., assignors to Schering Corporation, Bloomfield, N.J., a corporation of New Jersey
No Drawing. Filed July 14, 1966, Ser. No. 565,107
10 Claims. (Cl. 260—397.5)

This application is a continuation-in-part of pending application Ser. No. 384,791 of Cecil H. Robinson and Lawrence E. Finckenor, filed July 23, 1964, now U.S. Patent No. 3,264,331.

This invention relates to compositions of matter classified in the art of chemistry as steroids, and more specifically as 3-lower alkanoylhydrazono-10-hydroperoxy-13-alkyl-gonanes and methods for their manufacture.

The invention sought to be patented is described as residing in the concept of a chemical compound having a molecular structure in which there is attached to a 13-alkyl-4-gonene nucleus a lower alkanoylhydrazone derivative at C–3, a 10-hydroperoxy derivative at C–10, and a configuration about C–17 of the group consisting of

wherein R represents hydrogen and hydrocarbon carbonyl having up to 8 carbon atoms and Y is a member of the group consisting of hydrogen, lower alkyl, lower alkenyl, lower alkynyl, and halogeno-lower alkynyl. The 13-alkyl groups in the gonane nucleus are preferably lower alkyl particularly 13-methyl.

In a pictorial sense, the novel compounds of this invention may be described as having minimally the following Formula I:

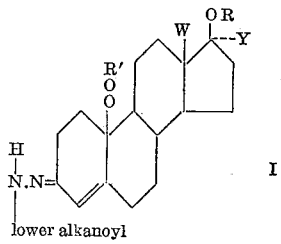

wherein R and R' are members selected from the group consisting of hydrogen and a hydrocarbon carbonyl having up to eight carbon atoms, W is a lower alkyl, and Y is a member selected from the group consisting of hydrogen, lower alkyl, lower alkenyl, lower alkynyl, halogenoethinyl, and trifluoromethylethinyl; and including the 1-dehydro analogs thereof.

The lower alkanoyl substituents on the hydrazone function at C–3 contemplated in this invention are those having up to 7-carbon atoms such as formyl, acetyl, caproyl, and the like.

Representative of the hydrocarbon carbonyl ester groups contemplated at C–17 and at C–10 as depicted by R and R' are lower alkanoyl such as acetyl, propionyl, caproyl, capryloyl, propargoyl, acryloyl, cyclopentylacetyl, and the like, as well as aromatic carbonyl groups such as benzoyl, and methyl homologs thereof, e.g. o, m, and p-toluyl.

By lower alkyl, as representative of W and Y, are contemplated hydrocarbon radicals having up to 4 carbon atoms such as methyl, ethyl, n- and iso-propyl, n-, iso- and tert.butyl, and the like, of which methyl and ethyl are preferred.

Representative of Y as lower alkenyl are such as vinyl and allyl; as lower alkynyl are such as ethinyl and propargyl; and as halogenoethinyl are such as chloroethinyl, bromoethinyl, and trifluoromethylethinyl.

The foregoing formula delineations are requisite in order for the composition of matter to fall within the scope of our concept. Other substituents may be present. For example, a methyl group may be present at the 6- and/or 16-position, an oxygen function such as hydroxy may be present at the 11-position and halogen may be present at one or more of the 6, 9 and 11-positions. The only limiting features of our concept insofar as it pertains to compositions of matter are those set forth above. In other words, our novel compounds are 10-hydroperoxy (or alkanoylperoxy)-13 - alkyl - gonanes having C-17 substituents as described and a 3-lower alkanoylhydrazone derivative of a 3-keto-4-dehydro- or a 3-keto-1,4-bis-dehydro system.

In addition considered as equivalents to the novel 3-lower alkanoylhydrazono-10-hydroperoxy - 13 - alkyl-4-gonenes of this invention as exemplified by compounds of Formula I, are those compounds wherein the 3- substituent is a benzoylhydrazone or a cyanoacetylhydrazone, such as 17α-ethinyl-4-estren-17β-ol-3-one 3-benzoylhydrazone and 17α-ethinyl-4-estren-17β-ol-3-one 3-cyanoacetylhydrazone.

Representative of the preferred compounds of this invention are 3-lower alkanoyl hydrazone derivatives of 3-keto-10-hydroperoxy-4-estrenes (i.e. compounds of Formula I wherein W is methyl) and, particularly, those wherein Y is an ethinyl function, such as 10-hydroperoxy-17α-ethinyl-4-estren-17β-ol-3-one 3-acetylhydrazone as well as the 10-acetate ester derivative thereof.

Other species of preferred compounds wherein W is methyl are the following:

10-hydroperoxy-17α-ethinyl-4-estren-17β-ol-3-one 3-formylhydrazone and the 10-acetate thereof,
10-hydroperoxy-17α-ethinyl-4-estren-17β-ol-3-one 3-cyclopropylcarbonylhydrazone and the 10-acetate thereof,
10-hydroperoxy-4-estren-17β-ol-3-one 3-acetylhydrazone and the 10-acetate thereof,
10-hydroperoxy-17α-methyl-4-estren-17β-ol-3-one 3-acetylhydrazone and the 10-acetate thereof,
10-hydroperoxy-17α-ethyl-4-estren-17β-ol-3-one 3-acetylhydrazone and the 10-acetate thereof.,
10-hydroperoxy-17α-chloroethinyl-4-estren-17β-ol-3-one 3-acetylhydrazone and the 10-acetate esters thereof.

The 3-lower alkanoylhydrazono-10-hydroperoxy-13-alkyl-4-gonenes of this invention are conveniently prepared by treating the corresponding 3-keto-10-hydroperoxy-13-alkyl-4-gonenes with a lower alkanoylhydrazine in methanol/acetic acid to obtain directly the corresponding 3-lower alkanoyl hydrazone derivative. Thus, 10-hydroperoxy-17α-ethinyl-4-estren-17β-ol-3-one upon treatment with a molar equivalent of monoacetylhydrazine in methanol to which a catalytic amount of glacial acetic acid has been added will yield 10β-hydroperoxy-17α-ethinyl-4-estren-17β-ol-3-one 3-acetylhydrazone which possesses antifertility activity.

To minimize the possibility of competing side reactions, the above process is usually carried out at room temperature for about 18 hours, although temperatures as high as about 65° C. maybe used for short periods of time. When preparing 3-lower alkanoylhydrazone derivatives of 3-keto-10-hydroperoxy-13-alkyl-1,4-gonadienes however, the reaction is preferably carried out at room temperature for longer periods of time, usually about 96 hours.

The 3-keto-10-hydroperoxy-13-alkyl-4-gonenes, necessary precursors for the 3-lower alkanoyl hydrazone derivatives of this invention, are prepared as described in pending application Serial No. 502,298 of Theodore Legatt and Elliot L. Shapiro, filed Oct. 25, 1965, now U.S. Patent No. 3,280,157.

Alternatively, the 3-monoacetylhydrazono-10-hydroperoxy-13-alkyl-4-gonenes of this invention are prepared by a novel process of this invention which comprises subjecting a solution of a 3-monoacetylhydrazono-13-alkyl-5(10)-gonene in an inert solvent, e.g. a halogenated hydrocarbon such as chloroform or methylene chloride, to the action of oxygen in the presence of light preferably at room temperature, whereby is obtained a 3-mono-acetylhydrazono-10-hydroperoxy-13-alkyl-gonene of this invention. For example, upon introduction of oxygen into a methylene chloride-hexane solution of 17α-ethinyl-5(10)-estren-17β-ol-3-one 3-acetylhydrazone, there is obtained 10-hydroperoxy-17α-ethinyl-4-estren-17β-ol-3 - one 3-acetylhydrazone which possesses antifertility activity.

The reaction of the alternate process of this invention is effected in solution, the solvent being one inert to the reactants under the conditions of the transformation. Suitable solvents are the halogenated hydrocarbons such as chloroform or methylene chloride; nitrogen containing solvents such as pyridine or dimethylformamide, and hydrocarbon solvents such as benzene, hexane, or others such as carbon disulfide or alcohols such as ethanol. The oxygen source may be a stream of oxygen itself, a stream of air, or simply the presence of the oxygen in the air. In our alternate process there may advantageously be employed free radical initiators such as benzoyl peroxide, azoisobutyronitrile or oxygen carriers such as hematoporphyrin. The reaction is usually carried out by bubbling the oxygen source through the solution of the 3-lower alkanoylhydrazono-5(10)-unsaturated - 13 - alkyl-gonane while illuminating the reaction vessel with white light such as from a common fluorescent lamp.

The 3-monoacetylhydrazono-13-alkyl-5(10) - gonenes, necessary intermediates for the alternate method for preparing the 3-lower alkanoylhydrazono-10-hydroperoxy-13-alkyl-4-gonenes of this invention are conveniently derived from the corresponding 3-keto compound by reaction with a lower alkanoylhydrazine as described in copending application Ser. No. 384,791 of Cecil H. Robinson and Lawrence E. Finckenor, filed July 23, 1965, now U.S. Patent No. 3,264,331.

To prepare a 10-mono-ester of this invention, a pyridine solution of an unesterified compound of this invention (i.e. a compound of Formula I wherein R and R' represent hydrogen, as exemplified by 17α-ethinyl-10-hydroperoxy-4-estren-17β-ol-3-one 3-acetylhydrazone) is treated at about 0° C. with about a molar equivalent of a hydrocarbon carboxylic acid anhydride (e.g. lower alkanoic acid anhydrides such as acetic anhydride and propionic anhydride) or with an acid halide of a hydrocarbon carboxylic acid (e.g. benzoyl chloride) whereby is obtained a 3-alkanoylhydrazono-17-hydroxy-4-gonene of this invention having an esterified 10-hydroperoxy function, e.g. the 10-acetate, the 10-propionate, and the 10-benzoate, respectively of 17α-ethinyl-10-hydroperoxy-4-estren-17β-ol-3-one 3-acetylhydrazone. If in the esterification procedure, there is used approximately two moles or more of acid anhydride or acid chloride, the 10,17-diester forms when the starting compound has a secondary hydroxy group at C-17 (i.e. a compound of Formula I wherein R and Y are hydrogen.

Thus, 10β-hydroperoxy-4-estren-17β-ol-3-one 3-acetylhydrazone in pyridine upon reaction with two or more moles of acetic anhydride will yield 10β-hydroperoxy-4-estren-17β-ol-3-one 3-acetylhydrazone 10,17-diacetate.

When a 17-monoacyloxy derivative of this invention is desired (i.e. a compound of Formula I wherein R' represents hydrogen and R represents a hydrocarbon carbonyl, as exemplified by 10-hydroperoxy-17α-ethinyl-4-estren-17β-ol-3-one 3-acetylhydrazone 17-acetate), one may use either process aspects of this invention provided the 17-ester group is present in the starting compound prior to introduction of the 3-acetylhydrazone or the 10-hydroperoxy group. Thus, by introducing oxygen into a pyridine solution of 17α-ethinyl-5(10)-estren-17β-ol-3-one 17-acetate in the presence of hemotaporphyrin, and illuminated by fluorescent light, there is introduced a 10-hydroperoxy group with a concomitant shift of the double bond to produce 10-hydroperoxy-17α-ethinyl-4-estren-17β-ol-3-one 17-acetate which upon reaction with acetylhydrazine in methanol/acetic acid will yield the desired 10-hydroperoxy-17α-ethinyl-4-estren-17β-ol-3-one 3-acetylhydrazone 17-acetate.

Alternatively, the 3-keto-17-acyloxy-5(10)-gonene intermediate (e.g. 17α-ethinyl-5(10)-estren-17β-ol-3-one 17-acetate) is first converted to the desired 3-lower alkanoylhydrazone derivative (e.g. to the acetylhydrazone derivative by reaction with acetylhydrazine in methanol/acetic acid) and the 3-lower alkanoylhydrazono-17-acyloxy-5(10)-gonene thereby formed (e.g. 17α-ethinyl-5(10)-estren-17β-ol-3-one 3-acetylhydrazone 17-acetate) in an inert solvent is then reacted according to our novel process with oxygen while being illuminated with white light, whereby is formed the desired 3-lower alkanoylhydrazono-10β-hydroperoxy-17-acyloxy-4 - gonene (e.g. 10β-hydroperoxy-17α-ethinyl - 4 - estren-17β-ol-3-one 3-acetylhydrazone 17-acetate).

The requisite 17β - acetoxy-17α-ethinyl-5(10)-gonene starting compounds for the aforedescribed procedures for preparing a 17-monoacetate of Formula I are derived from the corresponding 3-alkoxy-17-acyloxy-2,5(10)-gonadienes. Thus, 3-methoxy-17α-ethinyl-2,5(10)-estradien-17β-ol 17-acetate upon treatment with oxalic acid according to known techniques, yields 17α-ethinyl-5(10)-estren-17β-ol-3-one 17-acetate.

The precursor for the 17-mono-acetate derivatives, e.g. 3 - methoxy - 17α - ethinyl - 2,5(10) - estradiene - 17β-ol 17-acetate is conveniently prepared from 3 - methoxy-2,5(10)-estradien-17-one by reaction with acetic acid anhydride and sodium acetylide in dimethylformamide under an atmosphere of nitrogen as described in Example 4A of this application. It is apparent in the above-described conversions that by substituting other lower alkanoic anhydrides such as caproic and caprylic anhydrides, there is obtained the corresponding 17-caproate and 17-caprylate, respectively, of 3-methoxy-17α-ethinyl-2,5(10)-estradien-17β-ol from whence may be derived the 17-caproate and 17-caprylate respectively of 17α-ethinyl-5(10)-estrene-17β-ol-3-one convertible by either one of the two routes described hereinabove to 10-hydroperoxy - 17α - ethinyl - 4 - estren - 17β - ol - 3 - one 3-alkanoylhydrazone of this invention.

We have described a method of preparing 17-mono esters of compounds of Formula I wherein Y is ethinyl. When it is desired to prepare a 17-monoester of a compound of Formula I wherein Y is hydrogen, lower alkyl, or lower alkenyl, the 17-hydroxy group in the 3-alkoxy-13-alkyl-2,5(10)-gonadiene is usually esterified according to known procedures prior to introduction of the 10-hydroperoxy-Δ⁴- or the 3-lower alkanoylhydrazone function. For example, 3 - methoxy - 2,5(10) - estradien - 17β-ol upon reaction with acetic anhydride of benzoylchloride in pyridine at room temperature yields 3-methoxy-17β-acetoxy - 2,5(10) - estradiene and 3 - methoxy - 17β-benzoyloxy-2,5(10)-estradiene, respectively, whereas 3-methoxy - 17α - vinyl - 2,5(10) - estradien - 17β - ol and 3 - methoxy - 17α - methyl - 2,5(10) - estradien - 17β - ol upon reaction with acetic anhydride or benzoylchloride in pyridine at elevated temperatures will yield 3-methoxy-17α - vinyl - 2,5(10) - estradien - 17β - ol 17-acetate and 3 - methoxy - 17α - methyl - 2,5(10) - estradien - 17β-ol-3-one 17-acetate and the corresponding 17-benzoates, respectively. Treatment with oxalic acid in known manner of each of the foregoing 17-monoesters, followed by oxygenation of the resulting 3-keto-5(10)-estrene intermediate in a chloroform solution in the presence of light yields the corresponding 3-keto-10β-hydroperoxy-4-estrene 17-monoesters convertible by reaction with acetylhydrazine in methanol/acetic acid to the novel 3-acetylhydrazono - 10β - hydroperoxy - 4 - estern - 17β - ol 17-monoesters of this invention.

Alternatively, the 3-keto-5(10)-estrene-17-monoesters prepared as decsribed above, i.e. 5(10) - estren - 17β - ol - 3 - one 17-acetate, 5(10) - estren - 17β - ol - 3 - one 17-benzoate, 17α - vinyl - 5(10) - estren - 17β - ol - 3 - one 17-acetate, 17α - methyl - 5(10) - estren - 17β - ol - 3 - one 17-acetate, 17α - vinyl - 5(10) - estren - 17β - ol - 3 - one 17-benzoate and 17α - methyl - 5(10) - estren - 17β-ol-3-one 17-benzoate, upon reaction with a lower alkanoylhydrazine, e.g. acetylhydrazine in methanol/acetic acid yields the corresponding 3-alkanoylhydrazone derivatives, i.e. 5(10) - estren - 17β - ol - 3 - one 3-acetylhydrazone 17-acetate, 5(10) - estren - 17β - ol - 3 - one 3 - acetylhydrazone 17-benzoate, 17α - vinyl - 5(10) - estren - 17β - ol - 3 - one 3-acetylhydrazone 17-acetate, 17α-methyl - 5(10) - estren - 17β - ol - 3 - one 3-acetylhydrazone 17-acetate, 17α - vinyl - 5(10) - estren - 17β-ol - 3 - one 3-acetylhydrazone 17-benzoate, and 17α-methyl - 4 - estren - 17β - ol - 3 - one 3-acetylhydrazone 17-benzoate, respectively.

Reaction of each of the foregoing with oxygen in the presence of light, according to our novel process yields 10β - hydroperoxy - 4 - estren 17-monoesters of our invention, namely, 10β - hydroperoxy - 4 - estren - 17β - ol-3 - one 3-acetylhydrazone 17-acetate, 10β - hydroperoxy-17α - vinyl - 4 - estren - 17β - ol - 3 - one 3-acetylhydrazone 17-acetate, 10β - hydroperoxy - 17α - methyl - 4-estren-17β-ol-3-one 3-acetylhydrazone 17-acetate, and the corresponding 17-benzoates.

It is apparent that depending upon what point in the process an ester group is introduced into the molecule, and by utilizing various esterification techniques known in the art, there can be prepared any variations of mono-, and di-esterified derivatives of 3-keto-10-hydroperoxy-13-alkyl-4-gonenes defined by Formula I.

The 3-keto-10-hydroperoxy-4-gonene 3-lower alkanoylhydrazones of this invention are valuable, physiologically active compounds. The preferred species of this invention are those compounds wherein the configuration at C–17 is

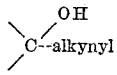

(the alkynyl being ethinyl, propargyl, halogenoethinyl, trifluoromethylethinyl) which are potent antifertility agents. Particularly valuable in this class is 10-hydroperoxy - 17α - ethinyl - 4 - estren - 17β - ol - 3 - one 3-acetylhydrazone (i.e. 10 - hydroperoxy - 13 - methyl-17α - ethinyl - 4 - gonen - 17β - ol - 3 - one 3-acetylhydrazone). This substance demonstrates antifertility activity when administered orally to the rat in dosages of about 5–9 mg./kg.

The 17β - hydroxy and the 17α - alkinyl - 17β - hydroxy-10 - hydroperoxy - 4 - gonen - 3 - one 3-lower alkanoylhydrazones of this invention exhibit anti-gonadal hormonal properties such as demonstrated by their ability to depress secondary sex structures in both male and female animals thus making them useful for the treatment of prostatic hypertrophy and for the regulation of gynocologic disorders, for example:

The compounds of this invention wherein Y is an alkenyl or an alkyl, are to some extent progestational in their action, making them of use, for example, in delaying the onset of heat in dogs and cats.

The 17α-alkyl analogs of the 3-alkanoylhydrazono-10-hydroperoxy-4-gonen-17β-ols of this invention also exhibit androgenic/anabolic activity.

The esters of the 3-alkanoylhydrazono-10-hydroperoxy-4-gonenes of this invention are of the same physiological utility as the unesterified compounds. In some instances, the esterification of the 10β-hydroperoxy function reduces potency, but the ester function at C–17 may increase duration of activity.

The physiologically active compounds of this invention, e.g. 10-hydroperoxy-17α-ethinyl-4-estren-17β-ol-3-one 3-acetylhydrozone may be administered orally or parenterally, by incorporating a therapeutic dosage in conventional pharmaceutical form such as tablets, capsules, elixirs, suspensions, solutions, or the like. They can be administered in admixture with pharmaceutical excipients which are edible and which are chemically inert to the aforementioned 10-hydroperoxy-13-alkyl-4-gonene, exemplified by cornstarch, lactose, sucrose, gum arabic usually in admixture with an additive such as magnesium stearate, talc, and the like. Other compositions may be used such as fine powders or granules of 10-hydroperoxy-17α-ethinyl-4-estren-17β-ol-3-one 3-acetylhydrazone or derivatives thereof, which compositions may contain diluents and dispersing and surface active agents, and may be presented in a syrup, or in non-aqueous suspensions, in aqueous suspensions or in an oil.

The following examples are illustrative of the novel compounds of this invention and the methods of their preparation. They are not to be construed as limiting, the limits of the invention being defined by the appended claims.

EXAMPLE 1

*10β-hydroperoxy-17α-ethinyl-4-estren-17β-ol-3-one 3-lower alkanoylhydrazone*

A. *10β - hydroperoxy-17α-ethinyl-4-estren-17β-ol-3-one 3-acetylhydrazone.*—Add 2 gm. of monoacetylhydrazine to a solution of 2 gm. of 10β-hydroperoxy-17α-ethinyl-4-estren-17β-ol-3-one in 80 ml. of methanol and 1.6 ml. of glacial acetic acid. Allow the solution to remain at room temperature for 18 hours, then pour the reaction solution into 500 ml. of water and collect the resultant precipitate comprising 10β - hydroperoxy-17α-ethinyl-4-estren-17β-ol-3-one 3-acetylhydrazone.

Purify by crystallization from a solvent mixture of methylene chloride/acetone/isopropyl ether.

B. React 10β-hydroperoxy-17α-ethinyl-4-estren-17β-ol-3-one in a manner similar to that described in above procedure A, but utilizing in place of monoacetylhydrazine, other lower alkanolylhydrazines such as formylhydrazine, cyclopropylcarbonylhydrazine, cyanoacetylhydrazine and benzoylhydrazine. Isolate and purify the resultant product in a manner similar to that described above to obtain respectively, 10β-hydroperoxy-17α-ethinyl-4-estren-17β-ol-3-one 3-formylhydrazone,
10β-hydroperoxy-17α-ethinyl-4-estren-17β-ol-3-one 3-cyclopropylcarbonylhydrazone,
10β-hydroperoxy-17α-ethinyl-4-estren-17β-ol-3-one 3-cyanoacetylhydrazone, and
10β-hydroperoxy-17α-ethinyl-4-estren-17β-ol-3-one 3-benzoylhydrazone.

C. React each of the following 10β-hydroperoxy-4-estren-3-ones with monoacetylhydrazine in a manner similar to that described in above procedure 1–A:

10β-hydroperoxy-17α-methyl-4-estren-17β-ol-3-one,
10β-hydroperoxy-17α-ethyl-4-estren-17β-ol-3-one,
10β-hydroperoxy-17α-propyl-4-estren-17β-ol-3-one,
10β-hydroperoxy-17α-chloroethinyl-4-estren-17β-ol-3-one,
10β-hydroperoxy-17α-trifluoromethylethinyl-4-estren-17β-ol-3-one,
10β-hydroperoxy-17α-vinyl-4-estren-17β-ol-3-one,
10β-hydroperoxy-13-ethyl-17α-ethinyl-4-gonen-17β-ol-3-one,
10β-hydroperoxy-13-ethyl-17α-methyl-4-gonen-17β-ol-3-one,
10β-hydroperoxy-13-ethyl-4-gonen-17β-ol-3-one,
10β-hydroperoxy-13-ethyl-17α-chloroethinyl-4-gonen-17β-ol-3-one, 10β-hydroperoxy-13-ethyl-17α-methylethinyl-4-gonen-17β-ol-3-one and
10β-hydroperoxy-17α-ethinyl-4-estren-17β-ol-3-one 17-acetate.

Isolate and purify the respective resultant products in a manner similar to that described in procedure 1–A to obtain, respectively, 10β-hydroperoxy-17α-methyl-4-estren-17β-ol-3-one 3-acetylhydrazone,
10β-hydroperoxy-17α-ethyl-4-estren-17β-ol-3-one 3-acetylhydrazone,
10β-hydroperoxy-17α-propyl-4-estren-17β-ol-3-one 3-acetylhydrazone,
10β-hydroperoxy-17α-chloroethinyl-4-estren-17β-ol-3-one 3-acetylhydrazone,
10β-hydroperoxy-17α-trifluoromethylethinyl-4-estren-17β-ol-3-one 3-acetylhydrazone,
10β-hydroperoxy-17α-vinyl-4-estren-17β-ol-3-one 3-acetylhydrazone,
10β-hydroperoxy-13-ethyl-17α-ethinyl-4-gonen-17β-ol-3-one 3-acetylhydrazone,
10β-hydroperoxy-13-ethyl-17α-methyl-4-gonen-17β-ol-3-one 3-acetylhydrazone,
10β-hydroperoxy-13-ethyl-4-gonen-17β-ol-3-one 3-acetylhydrazone,
10β-hydroperoxy-13-ethyl-17α-chloroethinyl-4-gonen-17β-ol-3-one 3-acetylhydrazone,
10β-hydroperoxy-13-ethyl-17α-methylethinyl-4-gonen-17β-ol-3-one 3-acetylhydrazone, and
10β-hydroperoxy-17α-ethinyl-4-estren-17β-ol-3-one 3-acetylhydrazone 17-acetate.

EXAMPLE 2

*Alternate procedure for the preparation of 10β-hydroperoxy - 17α - ethinyl - 4 - estren - 17β - ol - 3 - one 3-lower alkanoylhydrazone*

A. *10β - hydroperoxy-17α-ethinyl-4-estren-17β-ol-3-one 3-acetylhydrazone.*—Illuminate with white light, preferably from fluorescent light source, a solution of 1 gm. of 17α-ethinyl-5(10)-estren-17β-ol-3-one 3-acetylhydrazone in 75 ml. of chloroform into which a stream of oxygen is passed. Continue bubbling oxygen through the illuminated solution at room temperature for 17 hours. Collect by filtration the resultant precipitate which is formed, comprising 10β - hydroperoxy-17α-ethinyl-4-estren-17β-ol-3-one 3-acetylhydrazone. Purity by crystallization from methylene chloride/acetone/isopropyl ether.

B. Treat each of 17α-ethinyl-5(10)-estren-17β-ol-3-one 3-formylhydrazone, 17α-ethinyl-5(10)-estren-17β-ol-3-one 3 - cyclopropylcarbonylhydrazone, 17α - ethinyl - 5(10)-estren-17β-ol - 3 - one 3-cyanoacetylhydrazone and 17α-ethinyl - 5(10) - estren - 17β-ol-3-one 3-benzoylhydrazone with oxygen in the presence of light in a manner described in above procedure 2–A to obtain respectively, 10β-hydroperoxy-17α-ethinyl-4-estren-17β-ol-3-one 3-formyldrazone,
10β-hydroperoxy-17α-ethinyl-4-estren-17β-ol-3-one 3-cyclopropylcarbonylhydrazone,
10β-hydroperoxy-17α-ethinyl-4-estren-17β-ol-3-one 3-cyanoacetylhydrazone, and
10β-hydroperoxy-17α-ethinyl-4-estren-17β-ol-3-one 3-benzoylhydrazone.

C. Treat each of the following 3-acetylhydrazone derivatives of 3-keto-5(10)-estrenes with oxygen in the presence of light in a manner similar to that described in above procedure 2–A:

17α-propyl-5(10)-estren-17β-ol-3-one 3-acetylhydrazone,
5(10)-estren-17β-ol-3one 3-acetylhydrazone,
5(10)-estren-17β-ol-3-one 3-acetylhydrazone 17-acetate, and
17α-methyl-5(10)-estren-17β-ol-3-one 3-acetylhydrazone.

Isolate and purify the resultant products in a manner similar to that described to obtain respectively, 10β-hydroperoxy-17α-propyl-4-estren-17β-ol-3-one 3-acetylhydrazone,
10β-hydroperoxy-4-estren-17β-ol-3-one 3-acetylhydrazone,
10β-hydroperoxy-4-estren-17β-ol-3-one 3-acetylhydrazone 17-acetate, and
10β-hydroperoxy-17α-methyl-4-estren-17β-ol-3-one 3-acetylhydrazone.

EXAMPLE 3

*10β-hydrocarbon carboxylic acid esters of 3-lower alkanoylhydrazono-10-hydroperoxy-13-alkyl-4-gonenes*

A. *10β-hydroperoxy-17α-ethinyl-4-estren-17β-ol-3 - one 3-acetylhydrazone 10-acetate.*—Dissolve 0.5 gm. of 10β-hydroperoxy-17α-ethinyl-4-estren-17β-ol-3-one 3 - acetylhydrazone in 12 ml. of pyridine pre-chilled to 0° C. Add 6 ml. of acetic anhydride at 0° C. and allow the reaction mixture to stand at room temperature for one hour, then pour into ice water and extract with chloroform. Concentrate the combined cholorform extracts in vacuo and crystallize the resultant residue from acetone/ether to obtain 10β-hydroperoxy-17α-ethinyl-4-estren-17β-ol-3-one 3-acetylhydrazone 10-acetate.

B. In the esterification procedure outlined above, by substituting for acetic anhydride other alkanoic acid anhydrides such as propionic and butyric acid anhydride, or by using an acid halide such as benzoyl chloride, there may be obtained the corresponding ester of the 10β-hydroperoxy function, e.g. the 10-propionate, 10-butyrate, and 10-benzoate, respectively, of 10β-hydroperoxy-17α-ethinyl-4-estren-17β-ol-3-one 3acetylhydrazone.

C. In a manner similar to that in above Example 3–A, esterify each of the 3-lower alkanoylhydrazone-10β-hydroperoxy-4-gonenes prepared in Example 1–B and 1–C with acetic anhydride in pyridine to obtain the corresponding 10-acetate ester thereof respectively, as follows:

10β-hydroperoxy-17α-ethinyl-4-estren-17β-ol-3-one 3-formylhydrazone 10-acetate,
10β-hydroperoxy-17α-ethinyl-4-estren-17β-ol-3-one 3-cyclopropylcarbonylhydrazone 10-acetate,
10β-hydroperoxy-17α-ethinyl-4-estren-17β-ol-3-one 3-cyanoacetylhydrazone 10-acetate,
10β-hydroperoxy-17α-ethinyl-4-estren-17β-ol-3-one 3-benzoylhydrazone 10-acetate,
10β-hydroperoxy-17α-methyl-4-estren-17β-ol-3-one 3-acetylhydrazone 10-acetate,
10β-hydroperoxy-17α-ethyl-4-estren-17β-ol-3-one 3-acetylhydrazone 10-acetate,
10β-hydroperoxy-17α-propyl-4-estren-17β-ol-3-one 3-acetylhydrazone 10-acetate,
10β-hydroperoxy-17α-chloroethinyl-4-estren-17β-ol-3-one 3-acetylhydrazone 10-acetate,
10β-hydroperoxy-17α-trifluoromethylethinyl-4-estren-17β-ol-3-one 3-acetylhydrazone 10-acetate,
10β-hydroperoxy-17α-vinyl-4-estren-17β-ol-3-one 3-acetylhydrazone 10-acetate,
10β-hydroperoxy-13-ethyl-17α-ethinyl-4-gonen-17β-ol-3-one 3-acetylhydrazone 10-acetate,
10βhydroperoxy-13-ethyl-17α-methyl-4-gonen-17β-ol-3-one 3-acetylhydrazone 10-acetate,
10β-hydroperoxy-13-ethyl-4-gonen-17β-ol-3-one 3-acetylhydrazone 10,17-diacetate,
10β-hydroperoxy-13-ethyl-17α-chloroethinyl-4-gonen-17β-ol-3-one 3-acetylhydrazone 10-acetate,
10β-hydroperoxy-13-ethyl-17α-methylethinyl-4-gonen-17β-ol-3-one 3-acetylhydrazone 10-aceate, and
10β-hydroperoxy-17α-ethinyl-4-estren-17β-ol-3-one 3-acetylhydrazone 10,17-diacetate.

D. It is to be noted in above procedure 3–C that under the esterification conditions therein, when the starting compound is 10β-hydroperoxy-4-estren-17β-ol-3-one, the ester formed is the 10,17-diacetate. When the 10-monoacetate of 10β-hydroperoxy-4-estren-17β-ol-3-one is desired, there should be utilized a smaller quantity of acetic anhydride, namely a quantity which is the molar equivalent of the steroid starting material, i.e. to 3.0 gm. of steroid, 1.0 ml. of acetic anhydride.

EXAMPLE 4

*10β-hydroperoxy-17α-ethinyl-4-estren-17β-ol-3-one 3-alkanoylhydrazone 17-lower alkanoyl*

A. *3-methoxy-17α-ethinyl-2,5(10)-estradien-17β-ol 17-acetate.*—To a solution of 40 g. of 3-methoxy-2,5(10)-estradien-17-one in 800 ml. of dimethylformamide under an atmosphere of Argon, add 13.4 g. of sodium acetylide. Stir at room temperature for 15 minutes then rapidly add 19.76 ml. acetic anhydride and stir at room temperature for one minute longer. Pour the reaction mixture into eight liters of water containing 250 g. of sodium chloride and stir under nitrogen for two hours. Filter the resultant precipitate comprising 3-methoxy-17α-ethinyl-2,5(10)-estradien-17β-ol 17-acetate. Purify by crystallization from aqueous methanol containing a drop of pyridine under nitrogen. M.P. 163–170° C., [α]$_D$ +58.8° (dioxane).

In the above procedure, by substituting for acetic anhydride the anhydrides of other lower alkanoic acids such as propionic anhydride and caproic anhydride, there is obtained the corresponding 17α-lower alkanoate ester, i.e. 3-methoxy-17α-ethinyl-2,5(10)-estradien-17β-ol 17-propionate and 3-methoxy-17α-ethinyl-2,5(10)-estradien-17β-ol 17-caproate, respectively.

B. *17α-ethinyl-5(10)-estren-17β-ol-3-one 17-acetate.*—To a suspension of 19 gm. of 3-methoxy-17α-ethinyl-2,5(10)-estradien-17β-ol 17-acetate in 1634 ml. of methanol and 324.9 ml. of water, add 19 gm. of oxalic acid. Stir at room temperature until a complete solution is reached and for 30 minutes longer (about one and one-half hours). Pour the reaction mixture into 16 liters of water and collect by filtration the resultant precipitate comprising 17α-ethinyl-5(10)-estren-17β-ol-3-one 17-acetate which is used without further purification in the procedure 4–C immediately following.

In the above procedure, by substituting for 3-methoxy-17α-ethinyl-2,5(10)-estradien-17β-ol 17-acetate the corresponding 17-propionate and 17-caproate esters, respectively, there is obtained 17α-ethinyl-5(10)-estren-17β-ol-3-one 17-propionate and 17α-ethinyl-5(10)-estren-17β-ol-3-one 17-caproate, respectively.

C. *10β - hydroperoxy - 17α - ethinyl-4-estren-17β-ol-3-one 17-acetate.*—Dissolve 13 gm. of 17α-ethinyl-5(10)-estren-17β-ol-3-one 17-acetate in 208 ml. of carbon tetrachloride. Pass oxygen through the solution while illuminating the solution with four fluorescent lights (four watts each). A precipitate slowly forms. Collect this resultant precipitate after 20–30 and 95 hours. Chromatograph the combined precipitate over 400 gm. of silica gel eluting with increasing percentages of ethyl acetate in chloroform. Combine the like fractions as determined by thin layer chromatography and infrared and ultra-violet spectra data. Evaporate the combined fractions in vacuo to a residue comprising 10β-hydroperoxy-17α-ethinyl-4-estren-17β-ol-3-one 17-acetate.

Purify by crystallization from aqueous methanol. M.P. 178–180° C., [α]$_D$ −29° (dioxane).

Similarly, in the above procedure by substituting for 17α-ethinyl-5(10)-estren-17β-ol-3-one 17-acetate, the corresponding 17-propionate and 17-caproate ester thereof, there is obtained 10β-hydroperoxy-17α-ethinyl-4-estren-17β-ol-3-one 17-propionate, and 10β-hydroperoxy-17α-ethinyl-4-estren-17β-ol-3-one 17-caproate, respectively.

D. In a manner similar to that described in Example 1, treat each of

10β-hydroperoxy-17α-ethinyl-4-estren-17β-ol-3-one 17-acetate,

10β-hydroperoxy-17α-ethinyl-4-estren-17β-ol-3-one 17-propionate, and

10β-hydroperoxy-17α-ethinyl-4-estren-17β-ol-3-one 17-caproate with acetylhydrazine in methanol-acetic acid. Isolate and purify the resultant product in a manner similar to that described in Example 1–A to obtain respectively, 10β-hydroperoxy-17α-ethinyl-4-estren-17β-ol-3-one 3-acetylhydrazone 17-acetate, 10β-hydroperoxy-17α-ethinyl-4-estren-17β-ol-3-one 3-acetylhydrazone 17-propionate, and 10β-hydroperoxy-17α-ethinyl-4-estren-17β-ol-3-one 3-acetylhydrazone 17-caproate, respectively.

In the above procedure, by utilizing in place of acetyl hydrazine, other lower alkanoylhydrazines such as formylhydrazine, cyclopropylcarbonylhydrazine, cyanoacetylhydrazine and benzoylhydrazine, there is obtained the corresponding 3-lower alkanoylhydrazone derivatives, i.e. the 3-formylhydrazone, the 3-cyclopropylcarbonylhydrazone, the 3-cyanoacetylhydrazone and the 3-benzoylhydrazone derivatives, respectively of 10β-hydroperoxy-17α-ethinyl-4-estren-17β-ol-3-one 17-acetate, 10β-hydroperoxy-17α-ethinyl-4-estren-17β-ol-3-one 17-propionate, and 10β-hydroperoxy-17α-ethinyl-4-estren-17β-ol-3-one 17-caproate, respectively.

EXAMPLE 5

*10β-hydroperoxy-17α-propynyl-4-estren-17β-ol-3-one 17-acetate*

A. *3 - methoxy - 17α-propynyl-2,5(10)-estradien-17β-ol 17-acetate.*—To a solution of 0.4 g. of 3-methoxy-2,5(10)-estradien-17-one in 8.5 ml. of dimethylformamide under an atmosphere of nitrogen, add 0.136 g. of a sodium salt of methyl acetylene (i.e. the sodium salt of propyne) dispersed in xylene (prepared according to known procedures by placing propyne into a solution of liquid ammonia and sodium, and then displacing the ammonia with xylene). Stir at room temperature for 20 minutes, then add 0.21 ml. of acetic anhydride. Stir the reaction mixture for five minutes at room temperature, then pour the reaction mixture into an aqueous saturated sodium chloride solution. Extract with mixture with methylene chloride and evaporate the combined methylene chloride extracts to a residue comprising 3-methoxy-17α-propynyl-2,5(10)-estradien-17β-ol 17-acetate. Purify by crystallization from aqueous ethanol containing a drop of pyridine.

In the above procedure, if in place of acetic anhydride there is used the anhydride of other lower alkanoic acids, such as propionic and n-butyric anhydride, there is obtained the corresponding lower alkanoic acid ester, i.e. 3-methoxy - 17α-propynyl-2,5(10)-estradien-17β-ol 17-propionate, and 3-methoxy-17α-propynyl-2,5(10)-estradien-17β-ol 17-butyrate, respectively.

B. *17α - propynyl-5(10)-estren-17β-ol-3-one 17-lower alkanoate.*—In a manner similar to that described in Example 4–B, treat each of 3-methoxy-17α-propynyl-2,5(10)-estradien-17β-ol 17-acetate, 3-methoxy-17α-propynyl-2,5(10)-estradien-17β-ol 17-propionate, and 3-methoxy-17α-propynyl-2,5(10)-estradien-17β-ol 17-butyrate, with oxalic acid in aqueous methanol. Isolate the resultant respective products in a manner similar to that described to obtain 17α-propynyl-5(10)-estren-17β-ol-3-one 17-acetate,
17α-propynyl-5(10)-estren-17β-ol-3-one 17-propionate, and
17α-propynyl-5(10)-estren-17β-ol-3-one 17-butyrate, respectively.

C. *10β-hydroperoxy-17α-propynyl-4 - estren-17β-ol - 3-*

*one 17-lower alkanoate.*—In a manner similar to that described in Example 4–C, treat a carbon tetrachloride solution of each of 17α-propynyl-5(10)-estren-17β-ol-3-one 17-acetate,
17α-propynyl-5(10)-estren-17β-ol-3-one
   17-propionate, and
17α-propynyl-5(10)-estren-17β-ol-3-one 17-butyrate, with oxygen in the presence of fluorescent light. Isolate and purify the resultant respective products in a manner similar to that described to obtain 10β-hydroperoxy-17α-propynyl-4-estren-17β-ol-3-one
   17-acetate,
10β-hydroperoxy-17α-propynyl-4-estren-17β-ol-3-one
   17-propionate, and
10β-hydroperoxy-17α-propynyl-4-estren-17β-ol-3-one
   17-butyrate, respectively.

D. *10β-hydroperoxy-17α-propynyl-4 - estren - 17β-ol-3-one 3-acetylhydrazone 17-lower alkanoyl ester.*—In a manner similar to that described in Example 1–A, treat each of the 3-keto 10β-hydroperoxy-17α-propynyl-4 - estrenes prepared in above Example 5–C with acetylhydrazine in methanol/glacial acetic acid. Isolate the respective resultant products in a manner similar to that described, to obtain 10β-hydroperoxy-17α-propynyl-4-estren-17β-ol-3-one
   3-acetylhydrazone 17-acetate,
10β-hydroperoxy-17α-propynyl-4-estren-17β-ol-3-one
   3-acetylhydrazone 17-propionate, and
10β-hydroperoxy-17α-propynyl-4-estren-17β-ol-3-one
   3-acetylhydrazone 17-butyrate, respectively.

EXAMPLE 6

*Alternate procedure for the preparation of 17α-substituted-10β-hydroperoxy-17β - acyloxy-4-estren-3 - one 3-acetylhydrazones*

A. *17α-substituted-5(10)-estren-17β-ol-3-one 3-acetylhydrazone 17-acylate.*—To a solution of 1 gm. of 17α-methyl-5(10)-estren-17β-ol-3-one 17-acetate in 15 ml. of methanol and 0.8 ml. of glacial acetic acid, add 1 gm. of acetylhydrazine and immediately add 0.8 ml. of glacial acetic acid. Allow the solution to stand at room temperature for about 30 minutes. Filter the resultant precipitate comprising 17α-methyl-5(10)-estren-17β-ol-3-one 3-acetylhydrazone 17-acetate. Purify by crystalization with methanol or alternatively with acetone-hexane.

In a similar manner allow each of the following to react with acetylhydrazine in acetic acid/methanol:

17α-ethyl-5(10)-estren-17β-ol-3-one 17-acetate,
17α-vinyl-5(10)-estren-17β-ol-3-one 17-acetate,
17α-propynyl-5(10)-estren-17β-ol-3-one 17-benzoate,
17α-ethinyl-5(10)-estren-17β-ol-3-one 17-acetate, and
17α-propenyl-5(10)-estren-17β-ol-3-one 17-caproate.

Isolate each of the resultant products in the above described manner to obtain respectively, 17α-ethyl-5(10)-estren-17β-ol-3-one 3-acetylhydrazone
   17-acetate,
17α-vinyl-5(10)-estren-17β-ol-3-one 3-acetylhydrazone
   17-acetate,
17α-propynyl-5(10)-estren-17β-ol-3-one
   3-acetylhydrazone 17-benzoate,
17α-ethinyl-5(10)-estren-17β-ol-3-one 3-acetylhydrazone 17-acetate, and
17α-propenyl-5(10)-estren-17β-ol-3-one 3-acetylhydrazone 17-caproate.

B. *10β-hydroperoxy-17α-substituted-4-estren - 17β-ol-3-one 3-acetylhydrazone 17-acylate.*—In a manner similar to that described in Example 2–A, treat a chloroform solution of 17α-methyl-5(10)-estren-17β-ol-3-one 3-acetylhydrazone 17-acetate with oxygen in the presence of white light. Isolate and purify the resultant product similar to that in the manner described to obtain 10β-hydroperoxy-17α-methyl-4-estren-17β-ol-3-one 3-acetylhydrazone 17-acetate.

In similar manner treat each of

17α-ethyl-5(10)-estren-17β-ol-3-one 17-acetate,
17α-vinyl-5(10)-estren-17β-ol-3-one 17-acetate,
17α-propynyl-5(10)-estren-17β-ol-3-one 17-benzoate,
17α-ethinyl-5(10)-estren-17β-ol-3-one 17-acetate, and
17α-propenyl-5(10)-estren-17β-ol-3-one 17-caproate, with oxygen in the presence of light and isolate and purify the resultant products to obtain respectively, 10β-hydroperoxy17α-ethyl-4-estren-17β-ol-3-one
   3-acetylhydrazone 17-acetate,
10β-hydroperoxy-17α-vinyl-4-estren-17β-ol-3-one
   3-acetylhydrazone 17-acetate,
10β-hydroperoxy-17α-propynyl-4-estren-17β-ol-3-one
   3-acetylhydrazone 17-benzoate,
10β-hydroperoxy-17α-ethinyl-4-estren-17β-ol-3-one
   3-acetylhydrazone 17-acetate, and
10β-hydroperoxy-17α-propenyl-4-estren-17β-ol-3-one
   3-acetylhydrazone 17-caproate.

EXAMPLE 7

*10,17-hydrocarbon carboxylic acid diesters of 3-lower alkanoylhydrazono-10-hydroperoxy-13-alkyl-4-gonenes*

A. *10β-hydroperoxy-17α-ethinyl-4-estren-17β-ol-3 - one 3-acetylhydrazone 10,17-diacetate.*—Dissolve 0.5 gm. of 10β-hydroperoxy-17α-ethinyl-4-estren-17β-ol-3-one 3-acetylhydrazone 17-acetate in 12 ml. of pyridine pre-chilled to about 0° C. Add 6 ml. of acetic anhydride and allow the reaction mixture to stand at room temperature for one hour. Pour the reaction mixture into ice water and extract with chloroform. Concentrate the combined chloroform extracts in vacuo and crystallize the resultant residue from ether to obtain 10β-hydroperoxy-17α-ethinyl-4-estren-17β-ol-3-one 3-acetylhydrazone 10,17-diacetate.

B. In the esterification procedure outline in above Example 7–A, by substituting for acetic anhydride other acid anhydrides such as propionic anhydride and caproic acid anhydride or by using an acid halide such as benzoylchloride, there may be obtained the corresponding esters of the 10β-hydroperoxy function, e.g. the 10-propionate, 10-caproate and 10-benzoate, respectively of 10β-hydroperoxy-17α-ethinyl-4-estren-17β-ol-3-one 3 - acetylhydrazone 17-acetate.

C. In a manner similar to that described in above Example 7–A, treat with acetic anhydride in pyridine 10β-hydroperoxy-17α-propynyl-4-estren-17β-ol-3-one
   3-acetylhydrazone 17-acetate,
10β-hydroperoxy-17α-methyl-4-estren-17β-ol-3-one
   3-acetylhydrazone 17-acetate,
10β-hydroperoxy-17α-vinyl-4-estren-17β-ol-3-one
   3-acetylhydrazone 17-acetate,
10β-hydroperoxy-17α-propynyl-4-estren-17β-ol-3-one
   3-acetylhydrazone 17-benzoate, and
10β-hydroperoxy-17α-propenyl-4-estren-17β-ol-3-one
   3-acetylhydrazone 17-caproate.

Isolate and purify the resultant products in a manner similar to that described in Example 7–A to obtain respectively, 10β-hydroperoxy-17α-propynyl-4-estren-17β-ol-3-one
   3-acetylhydrazone 10,17-diacetate,
10β-hydroperoxy-17α-methyl-4-estren-17β-ol-3-one
   3-acetylhydrazone 10,17-diacetate,
10β-hydroperoxy-17α-vinyl-4-estren-17β-ol-3-one
   3-acetylhydrazone 10,17-diacetate,
10β-hydroperoxy-17α-propynyl-4-estren-17β-ol-3-one
   3-acetylhydrazone 10-acetate 17-benzoate, and
10β-hydroperoxy-17α-propenyl-4-estren-17β-ol-3-one
   3-acetylhydrazone 10-acetate 17-caproate.

EXAMPLE 8

*10β-hydroperoxy-17α-ethinyl-1,4-estradien-17β-ol-3-one 3-acetylhydrazone*

A. Stir a mixture of 1 gm. of 10β - hydroperoxy-17α-ethinyl - 1,4 - estradien - 17β - ol - 3 - one and 1.2 gm. of acetylhydrazine in 50 ml. of methanol and 2.0 ml. of glacial acetic acid at room temperature for 96 hours. Pour the reaction mixture into 200 ml. of water and filter and dry the resultant precipitate comprising 10β - hydroperoxy 17α - ethinyl - 1,4 - estradien-17β-ol-3-one 3-acetylhydrazone. Purify by crystallization from methanol-water.

B. In a similar manner, treat each of

10β-hydroperoxy-17α-ethinyl-1,4-estradien-17β-ol-3-one 10-acetate,
10β-hydroperoxy-13-ethyl-17α-ethinyl-1,4-estradien-17β-ol-3-one, and
10β-hydroperoxy-17α-methyl-1,4-estradien-17β-ol-3-one, with acetylhydrazine in methanol-glacial acetic acid. Isolate and purify the resultant products in a manner similar to that described above to obtain respectively, 10β-hydroperoxy-17α-ethinyl-1,4-estradien-17β-ol-3-one 3-acetylhydrazone 10-acetate,
10β-hydroperoxy-13-ethyl-17α-ethinyl-1,4-estradien-17β-ol-3-one 3-acetylhydrazone, and
10β-hydroperoxy-17α-methyl-1,4-estradien-17β-ol-3-one 3-acetylhydrazone.

We claim:
1. A composition of matter selected from the group of compounds having the following structural formula:

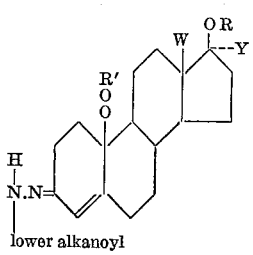

wherein R and R' are members selected from the group consisting of hydrogen and a hydrocarbon carbonyl having up to 8 carbon atoms; W is lower alkyl; and Y is a member selected from the group consisting of hydrogen, lower alkyl, lower alkenyl, lower alkynyl, halogenoethinyl, and trifluoromethylethinyl; and the 1-dehydro analogs thereof.

2. The compound of claim 1 wherein R and R' are hydrogen, W is methyl and Y is ethinyl; said compound being 10β - hydroperoxy - 17α - ethinyl - 4 - estren-17β-ol-3-one 3-lower alkanoylhydrazone.

3. The compound of claim 1 wherein R and R' are hydrogen, W is methyl, Y is ethinyl and the 3-lower alkanoyl is acetyl, said compound being 10β-hydroperoxy-17α-ethinyl-4-estren-17β-ol-3-one 3-acetylhydrazone.

4. The compound of claim 1 wherein R and R' are hydrogen, W and Y are methyl, and said lower alkanoyl is acetyl, said compound being 10-hydroperoxy-17α-methyl-4-estren-17β-ol-3-one 3-acetylhydrazone.

5. The compound of claim 1 wherein R and R' are hydrogen, W is methyl, Y is chloroethinyl, said lower alkanoyl is acetyl; said compound having the name 10-hydroperoxy-17α-chloroethinyl-4-estren-17β - ol - 3 - one-3-acetylhydrazone.

6. The compound of claim 1 wherein R, R' and Y are hydrogen, W is methyl, said lower alkanoyl is acetyl, said compound being 10-hydroperoxy - 4 - estren - 17β-ol-3-one 3-acetylhydrazone.

7. The process for preparing a member selected from the group consisting of a 3-lower alkanoylhydrazone-10-hydroperoxy-4-dehydro compound of the 13-lower alkyl gonane series which comprises subjecting a solution of a compound selected from the group consisting of a 3-lower alkanoylhydrazone - 5(10) - dehydro - 13 - lower alkyl gonane in an inert solvent, to the action of oxygen in the presence of light.

8. The process of claim 7 wherein the oxygenation is effected in the presence of an oxygen carrier.

9. The process of claim 7 wherein the oxygenation is effected in the presence of a free radical initiator.

10. The process according to claim 7 wherein said 3-lower alkanoylhydrazono - 5(10) - dehydro - 13 - lower alkyl gonane is 17α - ethinyl - 5(10) - estren-17β-ol-3-one 3-acetylhydrazone, said process comprising bubbling oxygen through a solution of 17α-ethinyl - 5(10)-estren-17β-ol-3-one 3-acetylhydrazone in a non-reactive solvent in the presence of light whereby is prepared 10β-hydroperoxy - 17α - ethinyl - 4 - estren - 17β-ol-3-one 3-acetylhydrazone.

References Cited

UNITED STATES PATENTS 3,264,331   8/1966   Robinson et al. _____ 260—397.5

LEWIS GOTTS, *Primary Examiner.*

H. FRENCH, *Assistant Examiner.*